(12) United States Patent
Voglewede

(10) Patent No.: US 11,761,049 B1
(45) Date of Patent: Sep. 19, 2023

(54) SURFACE TREATMENT FOR A WELLBORE DRILL BIT

(71) Applicant: Halliburton Energy Services, Inc., Houston, TX (US)

(72) Inventor: Daniel Brendan Voglewede, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/077,502

(22) Filed: Dec. 8, 2022

(51) Int. Cl.
*C21D 8/00* (2006.01)
*C21D 9/00* (2006.01)
*C23C 8/26* (2006.01)
*C23C 8/22* (2006.01)
*B23B 51/00* (2006.01)

(52) U.S. Cl.
CPC .......... *C21D 8/005* (2013.01); *C21D 9/0068* (2013.01); *C23C 8/22* (2013.01); *C23C 8/26* (2013.01); *B23B 51/00* (2013.01); *B23B 2222/84* (2013.01)

(58) Field of Classification Search
CPC .............. C21D 8/005; C23C 8/22; C23C 8/26
See application file for complete search history.

(56) References Cited

U.S. PATENT DOCUMENTS

| 6,148,936 A | 11/2000 | Evans et al. |
| 7,044,243 B2 | 5/2006 | Kembaiyan et al. |

FOREIGN PATENT DOCUMENTS

WO WO-2016123102 A1 * 8/2016 ........... B24D 99/005

\* cited by examiner

*Primary Examiner* — Jessee R Roe
(74) *Attorney, Agent, or Firm* — Kilpatrick Townsend & Stockton, LLP

(57) ABSTRACT

Wellbore drill bits can be used for excavation through subterranean formations for extracting hydrocarbons from a reservoir. Wellbore drill bits can experience excessive force during extraction processes. Drill bits can be assembled with resilience. Thus, treating a subsurface of a metallic blank material by adding one or more elements to the subsurface of the metallic blank material inhibits chemical interactions between a metal binding mixture and one or more construing alloying agents of the metallic blank material. The metallic blank material and a reinforcing agent can be positioned in the drill bit mold to begin an infiltration process where the metal binding mixture fills gaps between the metallic blank material and the reinforcing agent to generate a metal-matrix composite.

20 Claims, 5 Drawing Sheets

US 11,761,049 B1

SURFACE TREATMENT FOR A WELLBORE DRILL BIT

TECHNICAL FIELD

The present disclosure relates generally to wellbore tools and, more particularly (although not necessarily exclusively), to surface treatments for a wellbore drill bit.

BACKGROUND

A well system, such as an oil and gas well system, can include a wellbore drilled through a subterranean formation for extracting hydrocarbons from a reservoir. Hydrocarbon extraction and exploration can involve various operations performed by multiple entities using a wide range of tools and technologies, such as wellbore drills and wellbore drill bits. The subterranean formation may include a rock matrix permeated by oil or gas for extraction using the well system. The wellbore drill bits can experience excessive forces and stresses during operation, for example while forming a wellbore.

DETAILED DESCRIPTION

Figure 1:
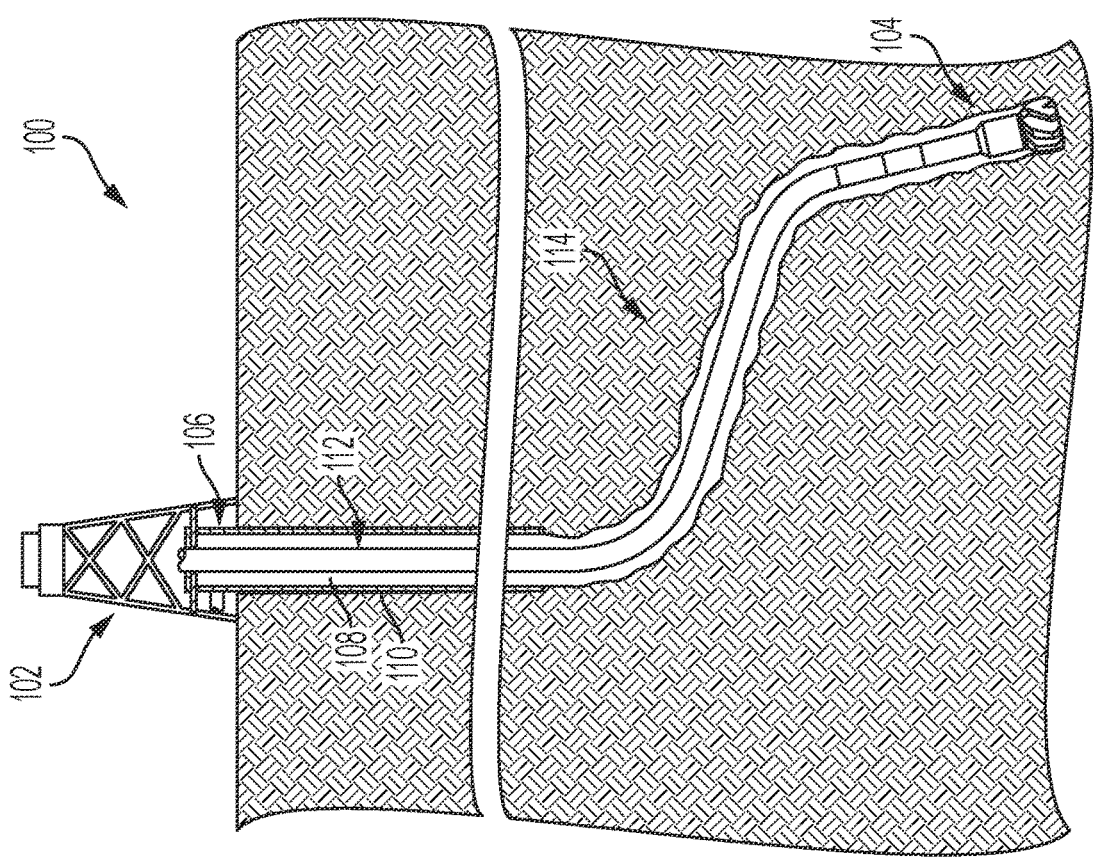
FIG. 1 is a schematic of an example of a wellbore system according to one example of the present disclosure.

Certain aspects and examples of the present disclosure relate to treating a surface of a wellbore drill bit to inhibit interactions between a metal binding mixture and one or more construing alloying agents of a metallic blank material of the wellbore drill bit. A metallic blank material can be a steel (e.g., stainless-steel, carbon-steel, and the like) component that can be positioned in a wellbore drill bit mold to form the wellbore drill bit and can provide a layer of strength during a process to form the wellbore drill bit. The metal binding mixture can include a mixture of steel and strengthening components, such as tungsten carbide, that can be generated at high temperatures. The metal binding mixture may also be referred to as the metal binding matrix. The metallic blank material and the metal binding mixture can be surface or subsurface treated with a type of infusion, coat, or particle addition to the binding mixture to prevent an undesired interaction. For example, the metallic blank material can undergo a surface treatment (e.g., coating, and the like), a subsurface treatment (e.g., nitriding, bonding, carburizing, and the like), or a combination thereof. Additionally, the metal binding mixture can receive additional elements that can inhibit interaction between the metal binding mixture and at least one construing alloying agent of the metallic blank material. Construing alloying agents may be chemical elements that can potentially bind to reinforcing components in a metal, weakening a surface or an interior of the metal.

The surface of the metallic blank material can melt, for example during an infiltration process due to the heat from the metal binding mixture, from a drill bit mold, or the like. Accordingly, deleterious effects can result from interactions that can exist between the steel-reinforcing strengthening components and the metals (e.g., construing alloying agents) that can melt from the metallic blank material. The interactions between the steel reinforcing agents and the metals from the metallic blank can form a complex that leads to loss of ductility, and other similar performance degradations, of the metallic blank and the reinforcing agents. The loss of ductility, which can otherwise be referred to as embrittlement, may introduce weak contact points in the drill bit that can lead to cracking while the drill bit is in use. The metallic blank material surface, the metallic blank material subsurface, the metal binding mixture, or any suitable combination thereof, can be treated with chemical compounds that can inhibit the interactions from the chemicals in the metallic blank material and the chemicals in the metal binding mixture. With the metallic blank material in place in the mold, the metal binding mixture can be poured into the mold and seep into gaps between the metallic blank material and a steel-reinforcing agent. The process of pouring the metal binding mixture into the mold can thereby be referred to as an infiltration process.

The interactions can be inhibited by treating the surface or subsurface of the metallic blank material or the metal binding mixture by introducing one or more new elements to the subsurface of the metallic blank material, to the surface of the metallic blank material, to the metal binding matrix, or to a combination thereof. The one or more new elements can be added prior to combining the metal binding mixture and the metallic blank material, for example via the infiltration process. An example of a surface treatment can include infusion of a component that can generate a layer of strength that can inhibit interactions between the metallic blank material and the metal binding mixture. Another example of a surface modification that can inhibit interactions between the metallic blank material and the metal binding mixture can include addition of a coating that can include a given thickness to inhibit (or further inhibit) interactions. An example of a subsurface modification to the metal binding mixture can include adding components to the metal binding mixture that can inhibit interactions between the metallic blank and the metal binding mixture by forming complexes within the metal binding mixture.

A wellbore drill bit can be made with a low-carbon steel (e.g., ranging from 0.04 wt. % to 1 wt. %, or any other suitable range) mandrel that can allow for welding a connection to the drill bit. To make a one-piece metal-matrix drill bit, and thereby shorten a length of the drill bit, steel parts with rigid mechanical parts can be used. However, steels that may involve a eutectoid-style heat treatment can lose their advantageous properties after an infiltration process. One example of a pitfall in the process can include the interaction of construing alloying agents in the steel and a metal-matrix composite, which can lead to cracking. The metal-matrix composite can include the hardened amalgamation of the metals following the infiltration process. Some techniques can allow fixed cutter drill bits to bypass the mandrel welding process, which may involve additional rework cost elimination and lower resource usage. Further, through bypassing the welding process and thereby making a one-piece drill bit, a potential weak point that has the potential to fail downhole can be removed or otherwise avoided. A one-piece wellbore drill bit can also allow for a drill bit with a shorter length, which can provide strength during a drilling operation downhole.

In some examples, a subsurface modification technique, such as nitriding, bonding, and carburizing, can be performed on the metallic blank material for inhibiting or preventing interactions between construing alloying agents of the metallic blank material and the metal binding matrix. In this subsurface modification process, one or more elements may be added to the subsurface of the metallic blank material. The one or more elements may include carbon, boron, or nitrogen for carburizing, bonding, and nitriding, respectively. As an example, a chemical, such as ammonia for nitriding, may add a layer of nitrogen on a subsurface of the metallic blank. Ammonia, containing nitrogen, can be infused to a certain depth on the metallic blank to render the surface of the metallic blank chemically inert. For example, when nitriding a surface of a metal under heat, nitrogen dissociates from ammonia to form a transient nascent nitrogen layer prior to reacting with construing alloying agents. Ammonia can be further infused through the base layer of elemental nitrogen that can introduce compressive stress. The nitrogen may bind to aluminum or chromium, further forming a hardened layer of aluminum or chromium nitride.

In other examples, a surface modification technique, such as a chemical coating, can be a surface modification of the metallic steel blank where a coating can be applied to the surface of the metallic steel blank. The coating can be resistant to liquid-metal embrittlement. The coating can inhibit or prevent interactions between construing alloying agents of the metallic blank material and the metal binding matrix. For example, in addition to inhibiting dissolution of construing alloying agents of the metallic blank due to heat, this technique can be tailored to the construing alloying agents where the coating can form an inert chemical complex with the construing alloying agents of the metallic blank. For example, a chemical coat that can be tailored to the construing alloying agents can include one or more chemicals that can bind the metallic blank construing alloying agents to inhibit leaching of the agents and thereby avoiding deleterious effects. The chemical coating can include a chemical coating that does not cause deleterious effects to the metal-matrix composite itself. In some examples, the coating can include a black oxide coating, a titanium coating, etc.

A third surface modification technique can involve a particle reinforcement modification of the metal binding mixture. Chemical elements can be added to the particle reinforcement that can limit the solubility of steel or alloying components of the metal-matrix composite. For example, adding one or more particular chemicals to the particle reinforcement pool can inhibit dissolution from the metallic blank material. In some examples, the chemicals may include chromium, iron, nickel, molybdenum, niobium, titanium, and vanadium. Additionally, adding chemicals to the particle reinforcement pool can generate intermetallic complexes that can inhibit alloying agents from entering the matrix portion of the metal-matrix composite. The composition of the metal binding matrix, which can include various molten metallic elements and compounds, including construing alloying agents such as, iron, nickel, chromium, molybdenum, niobium, titanium, and vanadium, can affect properties that can include viscosity or melting point, for example, considering the properties can be dependent on a mixture's composition. Infiltration time, thereby, may depend on a particular composition of the metal binding matrix.

Examples of construing alloying agents can include chromium, iron, nickel, molybdenum, niobium, titanium, and vanadium. The construing alloying agents, when dissolved from the metallic blank material, can bind to the reinforcing agent of the metal-matrix composite. Eta phase can be an embrittlement phenomenon that can be highly undesired in steel in the presence of tungsten carbide due to embrittlement. Eta phase occurs when a first chemical element of the metallic blank material and a second chemical element of another component form a complex that makes the metal-matrix composite brittle and susceptible to cracks. For example, the complexed interaction between tungsten carbide and a construing alloying agent of the metallic blank material can generate the Eta phase. Embrittlement due to the Eta phase can render the wellbore drill bit fragile.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of an example of a drilling system 100 drilling downhole in a wellbore 114 according to one example of the present disclosure. The drilling system 100 can include a drilling rig 102 that can be a land-based drilling rig. A well site 106 can include various types of drilling equipment pieces such as drilling fluid tanks, drilling fluid pumps, and rotary tables. A drill string 112 on the drill rig 102 can be associated with producing drilling fluid and torque to a wellbore drill bit 104. The wellbore 114 can be lined with a casing string 110 to protect and stabilize the wellbore 114. The drill string 112 can be surrounded by an annulus void 108 where volumes of a liquid such as drilling fluid, can be populated and circulated uphole. The annulus void can further protect the casing string 110 and the wellbore drill bit 104 from the encountered pressures of any subterranean formation. The wellbore drill bit 104 can directionally drill downhole and can include polycrystalline diamond compact (PDC) cutters as well as other suitable components for a wellbore drill bit.

The wellbore drill bit 104 can be formed from a combination of various metals. Assembly of a wellbore drill bit 104 can involve multiple steps. For example, forming the wellbore drill bit 104 can involve adding a first amount of a reinforcing agent to a wellbore drill bit mold. The reinforcing agent can be a chemical, such as tungsten carbide and other suitable materials for the reinforcing agent. A surface or subsurface-treated metallic blank material can then be positioned within the drill bit mold followed by a second addition of the reinforcing agent. A metallic blank material can include a steel (e.g., stainless-steel, carbon-steel, and the like) component that can be positioned in a wellbore drill bit mold to form the wellbore drill bit and can provide a layer of strength during a process to form the wellbore drill bit. Further, a treated metal binding mixture can be positioned into the drill bit mold, over the previous constituents, to begin the process of infiltration, which can form at least a portion of the wellbore drill bit 104.

Figure 2:
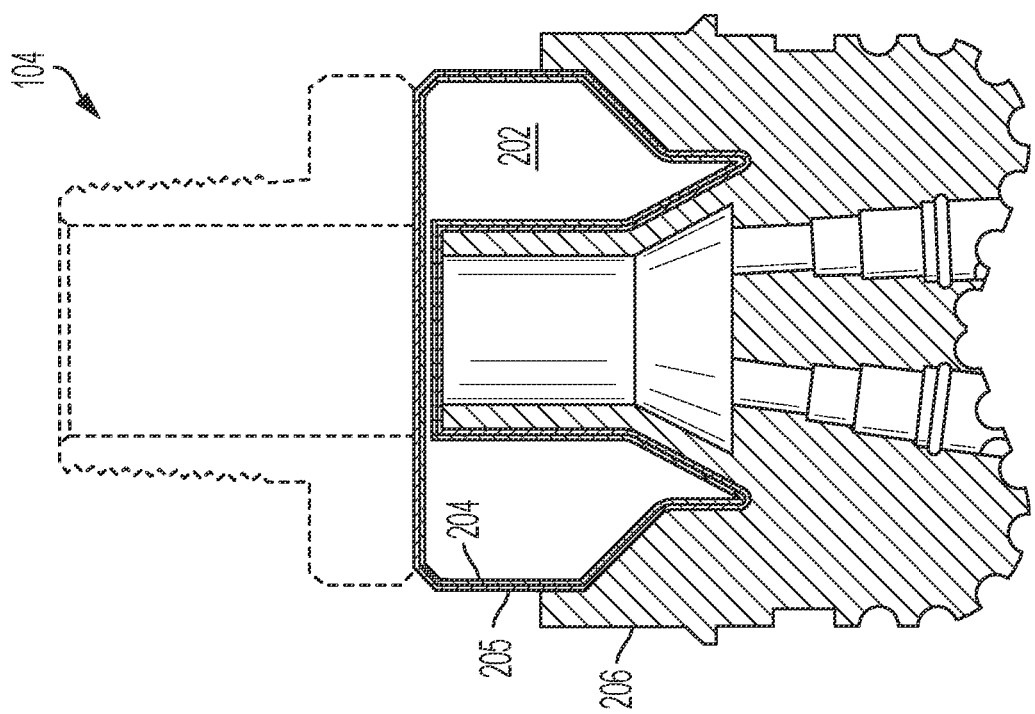
FIG. 2 is a cross-sectional view of a wellbore drill bit according to one example of the present disclosure.

FIG. 2 is a cross-sectional view of a wellbore drill bit 104 according to one example of the present disclosure. As illustrated, the wellbore drill bit 104 includes various layers such as a metallic blank material 202, a treated subsurface layer 204, a treated surface layer 205, and a metal binding matrix 206, though any other suitable layers can be included in the wellbore drill bit 104.

Prior to an infiltration process, the treated subsurface layer 204 or the treated surface layer 205 can be introduced to the wellbore drill bit 104. For example, the surface or the subsurface of the metallic blank material 202 can be treated to generate the treated surface layer 205 and the treated subsurface layer 204. In other examples, the metal binding matrix 206 can be treated with additional elements to generate the treated surface layer 205 and the treated subsurface layer 204. The metal binding matrix can include a reinforcing agent that can include a chemical such as tungsten carbide for reinforcing the wellbore drill bit 104. The metal binding matrix 206 can be introduced to the metallic blank material 202 to begin the infiltration process that can form metallurgical bonds between the metal binding matrix 206 and the metallic blank material 202. The metallic blank material 202, with the treated surface layer 205 and the treated subsurface layer 204, can be processed to generate the wellbore drill bit 104.

The processed and hardened metals of the wellbore drill bit 104 can be referred to as the metal-matrix composite following the infiltration process. Accordingly, the metal-matrix composite can refer to the culmination of layers of the metallic blank material 202, the treated surface layer 205 or the treated subsurface layer 204, the metal binding matrix 206, and other suitable layers or materials. The order of addition into a drill bit mold can be consistent for the multiple constituents and can involve treating the metallic blank material 202 prior to assembly of the wellbore drill bit 104. The techniques for surface and subsurface modifications of the metallic blank material 202 and the metal binding matrix 206, respectively, can be performed simultaneously, independently, or a both prior to combination. A single technique, or a combination of any thereof, can be utilized in a process for forming the wellbore drill bit 104.

Figure 3:
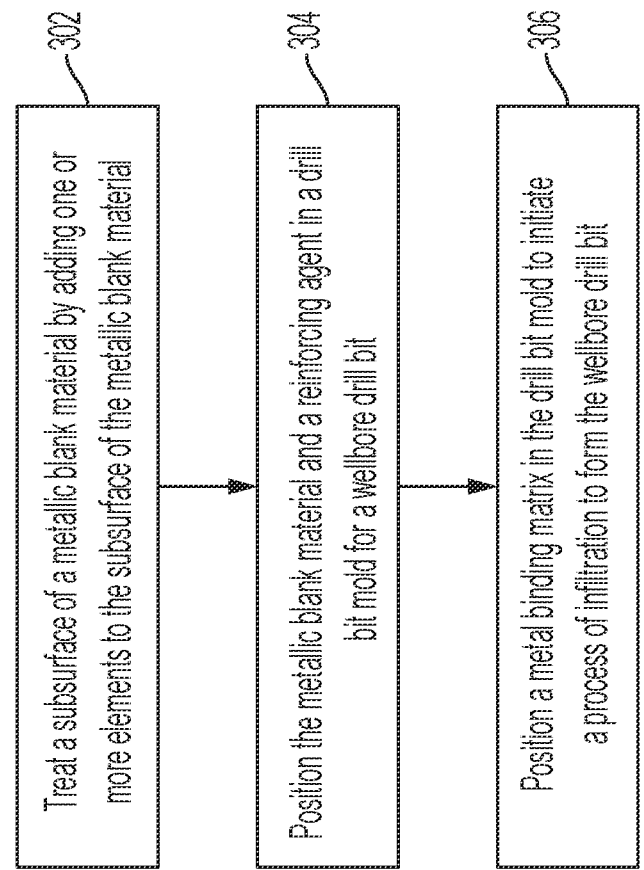
FIG. 3 is a flowchart of a process for treating a subsurface of a metallic blank material for forming a wellbore drill bit according to one example of the present disclosure.

FIG. 3 is a flowchart of a process 300 for forming a wellbore drill bit 104 with a subsurface-treated metallic blank material 202 according to one example of the present disclosure. At block 302, a subsurface of a metallic blank 202 is treated by adding one or more elements to the subsurface of the metallic blank 202. The metallic blank material 202 can be subsurface treated with one or more elements to inhibit interactions between the metal binding matrix 206 and construing alloying agents of the metallic blank material 202. In this subsurface modification process, the one or more elements may include carbon, boron, or nitrogen for carburizing, bonding, or nitriding, respectively. Prior to positioning the metallic blank material 202 in the wellbore drill bit mold, the metallic blank material 202 can be subsurface treated via nitriding, bonding, carburizing, other suitable subsurface treatments, or any suitable combination thereof. For example, infusing ammonia, such as in a process of nitriding, into the metal surface under heat may generate a protective layer of nitrogen that can inhibit interactions between construing alloying agents of the metallic blank material 202 and the metal binding matrix 206 prior to and or during the infiltration process. The nitrogen may bind to aluminum or chromium, further forming a hardened layer of aluminum or chromium nitride. The possible subsurface treatments can include adding one or more elements where (i) a layer of nitrogen may be added by nitriding, where ammonia can be infused into the surface of a metal, (ii) a layer of carbon may be added by carburizing, where a carbon source such as carbon monoxide can be infused into the surface of a metal, (iii) a layer of boron may be added by bonding, or boronizing, where boron atoms are infused into the surface of a metal, or the like. Once the metallic blank material 202 is surface treated via nitriding, carburizing, bonding, or the like, the metallic blank material 202 can then be positioned within the wellbore drill bit mold.

At block 304, the metallic blank material 202 and a reinforcing agent is positioned in a drill bit mold for a wellbore drill bit. The process for forming a wellbore drill bit 104 may otherwise be similar to one where the metallic blank material 202 is not subsurface treated. For instance, in a process for forming a non-subsurface-treated wellbore drill bit, the metallic blank material 202 can be placed in the wellbore drill bit. Additionally, a metal binding matrix can be positioned in a wellbore drill bit mold. And, the infiltration process occurs, leading to the completion of the wellbore drill bit 104. The time and temperature associated with the infiltration process of a subsurface-treated or surface-treated metallic blank material 202 may correspond to the composition of the metallic blank material 202 and may be different for each chemical subsurface treatment. Following the infiltration process, the metal-matrix composite hardening or formation time may also correspond to the composition and temperature of the wellbore drill bit 104.

At block 306, the metal binding matrix 206 is positioned in a wellbore drill bit mold to initiate a process of infiltration to form the wellbore drill bit. For example, the wellbore drill bit mold may first be lined with at least a portion of the reinforcing agent. Following, a subsurface-treated metallic blank material 202 may then be positioned within the wellbore drill bit mold. Additionally, another portion of reinforcing agent may be positioned in the wellbore drill bit mold following positioning of the metallic blank material 202. The metal binding matrix 206 may then be positioned in the wellbore drill bit mold to allow for metallurgical bonds to form during the infiltration process. The metal binding matrix 206 can bind the metallic blank material 202 and the reinforcing agent. The reinforcing agent can include a combination of one or more metallic compounds that can act to reinforce the multiple components of the wellbore drill bit 104. The reinforcing agent can, for example, include a reinforcing agent such as tungsten carbide or other suitable reinforcing agents. The reinforcing agent in some examples can be a reinforcing powder.

Figure 4:
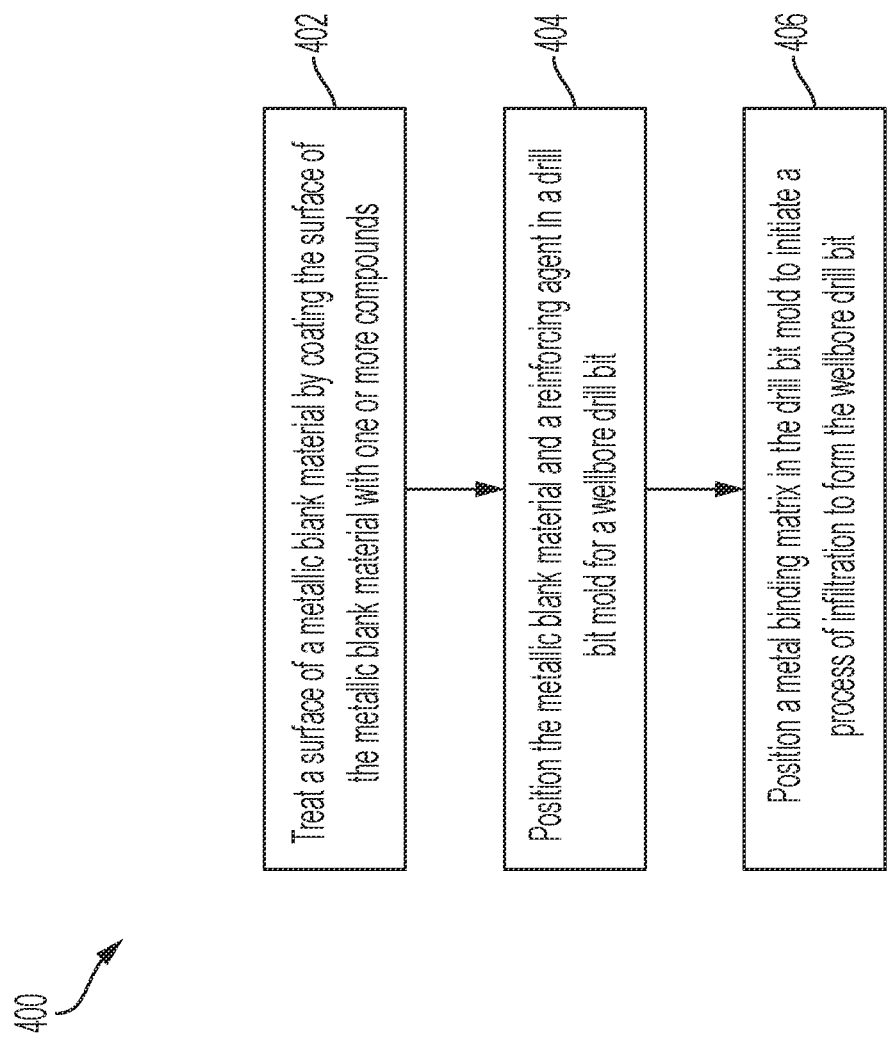
FIG. 4 is a flowchart of a process for treating a surface of a metallic blank material for forming a wellbore drill bit according to one example of the present disclosure.

FIG. 4 is a flowchart of a process 400 for forming a wellbore drill bit 104 with a surface-treated metallic blank material 202 according to one example of the present disclosure. At block 402, a surface of a metallic blank material 202 is treated by coating the surface of the metallic blank material 202 with one or more compounds. The treatment of the surface of the metallic blank material 202 may inhibit interactions between the metal binding matrix and construing alloying agents of the metallic blank material 202. Prior to positioning the metallic blank material 202 in the wellbore drill bit mold, the metallic blank material 202 can be surface coated so that, under heat, a protective layer may be generated that can inhibit interactions between the metal binding matrix 206 and construing alloying agents of the metallic blank material 202 during the infiltration process. The surface treatments can include a black-oxide coating, a titanium-based coating, or any other suitable surface treatments. In a black-oxide coating process, an iron-oxide layer can bond to the ferrous layer of the metallic blank material 202 to generate the protective layer. Similarly, in a titanium-coating process, a titanium layer can be formed positionally on the metallic blank material 202 and can form ferrous bonds to generate the protective layer. The surface coating can be layered positionally on the metallic blank material 202 to a depth that can render the surface of the metallic blank material 202 chemically inert. Once the metallic blank material 202 is surface treated through addition of a chemical or metallic coating, the metallic blank material 202 can then be positioned in the wellbore drill bit mold to initiate the infiltration process.

At block 404, the metallic blank material 202 and a reinforcing agent are positioned in a drill bit mold for a wellbore drill bit. The metallic blank material 202 having a treated surface, may be positioned after positioning of the reinforcing agent. The process for forming a wellbore drill bit 104 may otherwise be similar to one where the metallic blank material 202 is not surface treated. For instance, in a process for forming a non-surface-treated wellbore drill bit, the reinforcing agent can be positioned in a wellbore drill bit mold. Additionally, the metallic blank material 202 can be placed in the wellbore drill bit mold followed by an additional amount of reinforcing agent positioning. And, the infiltration process occurs, leading to the completion of the wellbore drill bit 104. The time and temperature associated with the infiltration process of a surface-treated metallic blank material 202 may correspond to the composition of the metallic blank material 202 and may be different for each chemical surface treatment. Following the infiltration process, the metal-matrix composite hardening or formation time may also correspond to the composition and temperature of the wellbore drill bit 104.

At block 406, a metal binding matrix 206 is positioned in a drill bit mold to initiate a process of infiltration to form the wellbore drill bit. For example, the wellbore drill bit mold, following positioning of the reinforcing agent and the metallic blank material 202, may be lined with the metal binding matrix 206 to allow for metallurgical bonds to form during the infiltration process. The metal binding matrix 206 can bind the metallic blank material 202 and the reinforcing agent. The reinforcing agent can include a combination of one or more metallic compounds that can act to reinforce the multiple components of the wellbore drill bit 104. The reinforcing agent can, for example, include a reinforcing agent such as tungsten carbide or other suitable reinforcing agents. The reinforcing agent in some examples can be a reinforcing powder.

Figure 5:
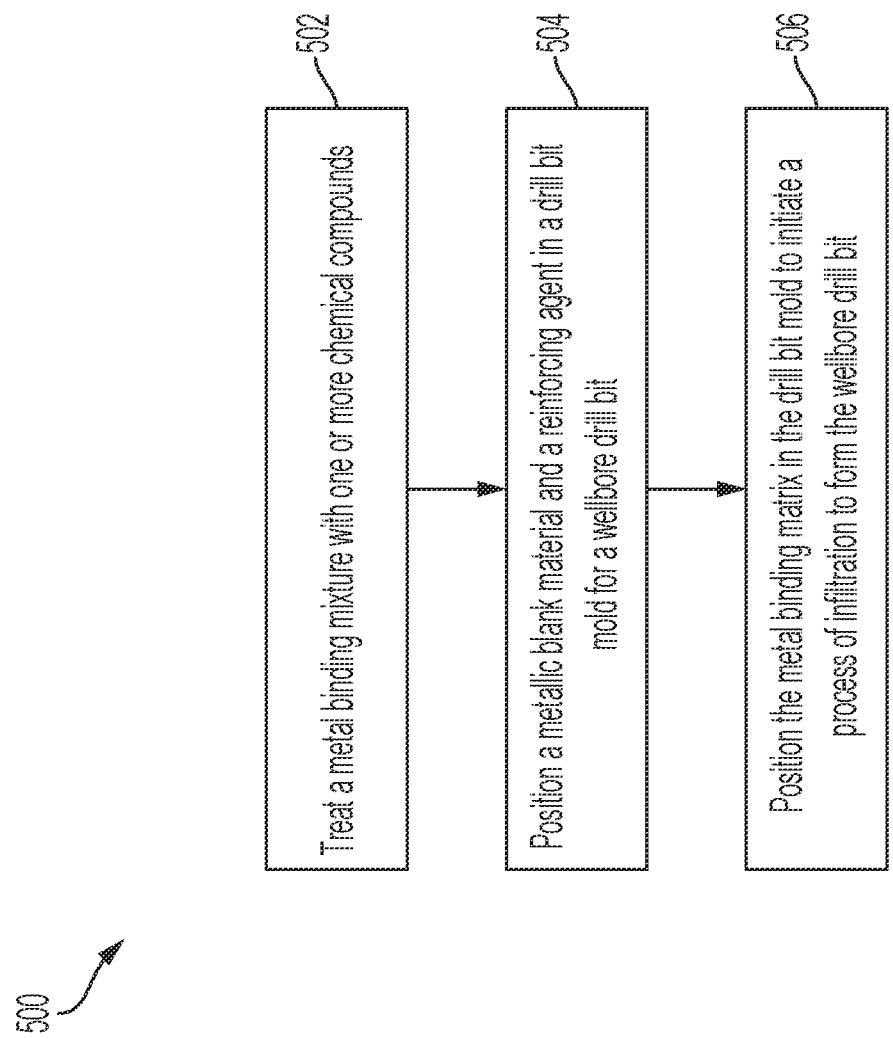
FIG. 5 is a flowchart of a process for preparing a metal binding mixture for forming a wellbore drill bit according to one example of the present disclosure.

FIG. 5 is a flowchart of a process 500 for forming a wellbore drill bit 104 with a treated metal binding matrix 206 according to one example of the present disclosure. At block 502, a metal binding matrix 206 is treated with one or more compounds. The metal binding matrix may be treated to inhibit interactions between the metal binding matrix 206 and construing alloying agents of the metallic blank material 202. Prior to, or subsequent to, positioning the metal binding matrix 206 in the wellbore drill bit mold, the metal binding matrix 206 may be treated with one or more compounds or elements that can alter the composition of the metal binding matrix 206. The metal binding matrix 206 can be treated with compounds or elements that can form intermetallic bonds with construing alloying agents of the metallic blank material 202 such that one or more elements from the metal binding matrix 206 are attracted to and bond to the construing alloying agents of the metallic blank material 202. For example, adding a construing alloying agent to the metal binding matrix 206 can cause chromium from the metallic blank material 202 to bind such that chromium may be inhibited from binding to the reinforcing agent included in the metal binding matrix 206. Chromium bound to the reinforcing agent, for example tungsten carbide, can lead to embrittlement. The treatment can include adding one or more chemical elements such as iron, nickel, chromium, titanium, vanadium, molybdenum, and the like to the metal binding matrix 206. Once the metallic blank material 202 and the reinforcing agent is positioned in the wellbore drill bit mold, the treated metal binding matrix 206 can be positioned in the wellbore drill bit mold to begin the infiltration process.

At block 504 the metallic blank material 202 and a reinforcing agent are positioned in a drill bit mold for a wellbore drill bit. Following, the treated metal binding matrix 206 are positioned in the wellbore drill bit mold to initiate the infiltration process. The process for forming a wellbore drill bit 104 may otherwise be similar to one where the metal binding matrix 206 is not treated. For instance, in a process for forming a non-surface-treated wellbore drill bit, the reinforcing agent can be positioned in a wellbore drill bit mold. Additionally, the metallic blank material 202 can be placed in the wellbore drill bit mold followed by an additional amount of reinforcing agent positioning. And, the infiltration process occurs, leading to the completion of the wellbore drill bit 104. The time and temperature associated with the infiltration process of a surface-treated metallic blank material 202 may correspond to the composition of the metallic blank material 202 and the metal binding matrix and may be different for each chemical subsurface treatment. Following the infiltration process, the metal-matrix composite hardening or formation time may also correspond to the composition and temperature of the wellbore drill bit 104.

At block 506, the metal binding matrix 206 is positioned in the drill bit mold to initiate the process of infiltration to form the wellbore drill bit. For example, the wellbore drill bit mold, following positioning of the reinforcing agent and the metallic blank material 202, may be lined with the metal binding matrix 206 to allow for metallurgical bonds to form during the infiltration process. The metal binding matrix 206 can bind the metallic blank material 202 and the reinforcing agent. The reinforcing agent can include a combination of one or more metallic compounds that can act to reinforce the multiple components of the wellbore drill bit 104. The reinforcing agent can, for example, include a reinforcing agent such as tungsten carbide or other suitable reinforcing agents. The reinforcing agent in some examples can be a reinforcing powder.

As used below, any reference to a series of examples is to be understood as a reference to each of those examples disjunctively (e.g., "Examples 1-4" is to be understood as "Examples 1, 2, 3, or 4"). In some aspects, methods for treating a surface of a wellbore drill bit are provided according to one or more of the following examples:

Example 1 is a method comprising: treating a subsurface of a metallic blank material by adding one or more elements to the subsurface of the metallic blank material to inhibit interaction between the metal binding mixture and one or more construing alloying agents of the metallic blank material; and positioning the metallic blank material and a metal binding mixture in a drill bit mold to form a metal-matrix composite to form a wellbore drill bit via an infiltration process.

Example 2 is the method of example 1 further comprising positioning a reinforcing agent including tungsten carbide in the metal binding mixture to form a metal-matrix composite with the metallic blank material.

Example 3 is the method of example 1, wherein treating the subsurface of the metallic blank material comprises: treating the subsurface by carburizing the subsurface, nitriding the subsurface, or bonding the subsurface.

Example 4 is the method of example 1, wherein treating the subsurface of the metallic blank material inhibits interaction of construing alloying agents of the metallic blank material with the metal binding mixture, wherein the construing alloying agents comprises one or more transition-state elements that comprises chromium, iron, nickel, molybdenum, niobium, titanium, or vanadium, and wherein the one or more elements comprise carbon, nitrogen, or boron.

Example 5 is the method of example 1, wherein treating the subsurface of the metallic blank material comprises treating the subsurface of the metallic blank material to a depth that corresponds to a time and temperature of the infiltration process.

Example 6 is the method of example 1, wherein treating the subsurface of the metallic blank material comprises treating the subsurface of the metallic blank material to a depth that ranges from 250 µm to 1 mm to render the subsurface of the metallic blank material chemically inert.

Example 7 is the method of example 1, wherein the metallic blank material comprises a carbon-based steel having a carbon content in a range of 0.04 wt. % to 1 wt. %.

Example 8 is a method comprising: treating a surface of a metallic blank material by coating the surface of the metallic blank material with one or more chemical compounds to inhibit interaction of the metal binding mixture with construing alloying agents of the metallic blank material; and positioning the metallic blank material and a metal binding mixture in a drill bit mold to form a metal-matrix composite to form a wellbore drill bit via an infiltration process.

Example 9 is the method of example 8 further comprising positioning a reinforcing agent including tungsten carbide in the metal binding mixture to form a metal-matrix composite with the metallic blank material.

Example 10 is the method of example 8, wherein treating the surface of the metallic blank material inhibits interaction of construing alloying agents of the metallic blank material with the metal binding mixture, and wherein the construing alloying agents include one or more transition-state elements that include chromium, iron, nickel, molybdenum, niobium, titanium, or vanadium.

Example 11 is the method of example 8, wherein treating the surface of the metallic blank material comprises treating the surface of the metallic blank material with a chemical coating, wherein the chemical coating comprises a black oxide surface treatment or a titanium surface treatment.

Example 12 is the method of example 8, wherein treating the surface of the metallic blank material with a surface coat forms intermetallic complexes from the surface coat to the construing alloying agents of the metallic blank material, and wherein treating the surface of the metallic blank material with the surface coat inhibits embrittlement of the metal-matrix composite.

Example 13 is the method of example 8, wherein treating the surface of the metallic blank material with a surface coat inhibits alloy dissolution from the metallic blank material, and wherein treating the surface of the metallic blank material inhibits interaction of construing alloying agents of the metallic blank material with the metal binding mixture.

Example 14 is the method of example 8, wherein treating the surface of the metallic blank material comprises treating the surface of the metallic blank material to a depth that ranges from 250 µm to 1 mm to render the surface of the metallic blank material chemically inert.

Example 15 is the method of example 8, wherein the metallic blank material comprises a carbon-based steel having a carbon content in a range of 0.04 wt. % to 1 wt. %.

Example 16 is a method comprising: treating a metal binding mixture with one or more chemical components to inhibit interaction of the metal binding mixture with construing alloying agents of a metallic blank material; and positioning the metallic blank material and the metal binding mixture in a drill bit mold to form a metal-matrix composite to form a wellbore drill bit during an infiltration process.

Example 17 is the method of example 16, wherein treating the metal binding mixture comprises treating the metal binding mixture with a first alloying agent to complex with a second alloying agent of the metal binding mixture, wherein combining two alloying agents inhibits interaction of the metal binding mixture with construing alloying agents of the metallic blank material.

Example 18 is the method of example 16, wherein treating the metal binding mixture with one or more chemical components, forms intermetallic complexes within the metal binding mixture and inhibits embrittlement of the metal-matrix composite.

Example 19 is the method of example 16, wherein treating the metal binding mixture with one or more chemical components corresponds to a composition of the metal binding mixture, and wherein the composition of the metal binding mixture corresponds to time and temperature of the infiltration process.

Example 20 is the method of example 16, wherein treating the metal binding mixture with one or more chemical components comprises one or more transition-state elements that include chromium, iron, nickel molybdenum, niobium, titanium, or vanadium.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
   treating a subsurface of a metallic blank material by adding one or more elements to the subsurface of the metallic blank material to inhibit interaction between a metal binding mixture and one or more construing alloying agents of the metallic blank material; and
   positioning the metallic blank material and the metal binding mixture in a drill bit mold to form a metal-matrix composite to form a wellbore drill bit via an infiltration process.

2. The method of claim 1 further comprising positioning a reinforcing agent including tungsten carbide in the metal binding mixture to form a metal-matrix composite with the metallic blank material.

3. The method of claim 1, wherein treating the subsurface of the metallic blank material comprises:
   treating the subsurface by carburizing the subsurface,
   nitriding the subsurface,
   or bonding the subsurface.

4. The method of claim 1, wherein treating the subsurface of the metallic blank material inhibits interaction of construing alloying agents of the metallic blank material with the metal binding mixture, wherein the construing alloying agents comprises one or more transition-state elements that comprises chromium, iron, nickel, molybdenum, niobium, titanium, or vanadium, and wherein the one or more elements comprise carbon, nitrogen, or boron.

5. The method of claim 1, wherein treating the subsurface of the metallic blank material comprises treating the subsurface of the metallic blank material to a depth that corresponds to a time and temperature of the infiltration process.

6. The method of claim 1, wherein treating the subsurface of the metallic blank material comprises treating the subsurface of the metallic blank material to a depth that ranges from 250 μm to 1 mm to render the subsurface of the metallic blank material chemically inert.

7. The method of claim 1, wherein the metallic blank material comprises a carbon-based steel having a carbon content in a range of 0.04 wt. % to 1 wt. %.

8. A method comprising:
    treating a surface of a metallic blank material by coating the surface of the metallic blank material with one or more chemical compounds to inhibit interaction of a metal binding mixture with construing alloying agents of the metallic blank material; and
    positioning the metallic blank material and the metal binding mixture in a drill bit mold to form a metal-matrix composite to form a wellbore drill bit via an infiltration process.

9. The method of claim 8 further comprising positioning a reinforcing agent including tungsten carbide in the metal binding mixture to form a metal-matrix composite with the metallic blank material.

10. The method of claim 8, wherein treating the surface of the metallic blank material inhibits interaction of construing alloying agents of the metallic blank material with the metal binding mixture, and wherein the construing alloying agents include one or more transition-state elements that include chromium, iron, nickel, molybdenum, niobium, titanium, or vanadium.

11. The method of claim 8, wherein treating the surface of the metallic blank material comprises treating the surface of the metallic blank material with a chemical coating, wherein the chemical coating comprises a black oxide surface treatment or a titanium surface treatment.

12. The method of claim 8, wherein treating the surface of the metallic blank material with a surface coat forms intermetallic complexes from the surface coat to the construing alloying agents of the metallic blank material, and wherein treating the surface of the metallic blank material with the surface coat inhibits embrittlement of the metal-matrix composite.

13. The method of claim 8, wherein treating the surface of the metallic blank material with a surface coat inhibits alloy dissolution from the metallic blank material, and wherein treating the surface of the metallic blank material inhibits interaction of construing alloying agents of the metallic blank material with the metal binding mixture.

14. The method of claim 8, wherein treating the surface of the metallic blank material comprises treating the surface of the metallic blank material to a depth that ranges from 250 μm to 1 mm to render the surface of the metallic blank material chemically inert.

15. The method of claim 8, wherein the metallic blank material comprises a carbon-based steel having a carbon content in a range of 0.04 wt. % to 1 wt. %.

16. A method comprising:
    treating a metal binding mixture with one or more chemical components to inhibit interaction of a metal binding mixture with construing alloying agents of a metallic blank material; and
    positioning the metallic blank material and the metal binding mixture in a drill bit mold to form a metal-matrix composite to form a wellbore drill bit during an infiltration process.

17. The method of claim 16, wherein treating the metal binding mixture comprises treating the metal binding mixture with a first alloying agent to complex with a second alloying agent of the metal binding mixture, wherein combining two alloying agents inhibits interaction of the metal binding mixture with construing alloying agents of the metallic blank material.

18. The method of claim 16, wherein treating the metal binding mixture with one or more chemical components, forms intermetallic complexes within the metal binding mixture and inhibits embrittlement of the metal-matrix composite.

19. The method of claim 16, wherein treating the metal binding mixture with one or more chemical components corresponds to a composition of the metal binding mixture, and wherein the composition of the metal binding mixture corresponds to time and temperature of the infiltration process.

20. The method of claim 16, wherein treating the metal binding mixture with one or more chemical components comprises one or more transition-state elements that include chromium, iron, nickel molybdenum, niobium, titanium, or vanadium.

\* \* \* \* \*